(12) United States Patent
Geissler

(10) Patent No.: US 8,387,517 B2
(45) Date of Patent: Mar. 5, 2013

(54) TEA KETTLE WITH DETACHABLE INFUSER AND INTEGRATED THERMOMETER

(75) Inventor: Richard L. Geissler, Chippewa Falls, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 0 days.

(21) Appl. No.: 12/756,033

(22) Filed: Apr. 7, 2010

(65) Prior Publication Data

US 2011/0250332 A1    Oct. 13, 2011

(51) Int. Cl.
*A47J 31/18* (2006.01)
*A47J 31/00* (2006.01)
*A47J 31/52* (2006.01)
*A47G 19/14* (2006.01)

(52) U.S. Cl. ............. 99/283; 99/316; 99/317; 426/435

(58) Field of Classification Search ............ 426/435
See application file for complete search history.

(56) References Cited

U.S. PATENT DOCUMENTS

| | | | | |
|---|---|---|---|---|
| 92,987 | A | * | 7/1869 | Moneuse et al. ............. 220/228 |
| 1,424,774 | A | * | 8/1922 | Pearl .............................. 99/319 |
| 2,093,980 | A | * | 9/1937 | Linger .......................... 99/285 |
| 2,219,949 | A | * | 10/1940 | Childs ............................ 99/343 |
| D146,999 | S | | 6/1947 | Wemyss |
| 2,476,072 | A | * | 7/1949 | Tressler ....................... 426/597 |
| D219,057 | S | | 10/1970 | Gulotta |
| 3,689,278 | A | * | 9/1972 | Carbonall ..................... 426/385 |
| D269,318 | S | | 6/1983 | Blanchard |
| D272,884 | S | | 3/1984 | Seibel |
| 4,683,812 | A | * | 8/1987 | Tarlow et al. ............... 99/289 R |
| 4,888,466 | A | | 12/1989 | Hoffmann |
| 4,888,467 | A | * | 12/1989 | Hoffmann ..................... 392/444 |
| 5,188,019 | A | * | 2/1993 | Vahabpour ...................... 99/285 |
| 5,245,914 | A | | 9/1993 | Vitous |
| D369,058 | S | | 4/1996 | Simmons |
| 5,715,742 | A | | 2/1998 | Cheich et al. |
| D411,404 | S | | 6/1999 | Littmann |
| 6,139,888 | A | | 10/2000 | Knepler |
| 6,142,063 | A | | 11/2000 | Beaulieu et al. |
| D439,789 | S | | 4/2001 | Kaposi et al. |

(Continued)

FOREIGN PATENT DOCUMENTS

DE        3801896    * 8/1989

OTHER PUBLICATIONS

Vintage Mirro Aluminum Tea Pot With Infuser GUC. http://cgi.ebay.com/ws/eBayISAPI.dll?ViewItem&item=250838004502+&clk_rvr_id=242061151516 Jun. 20, 2011.*

(Continued)

*Primary Examiner* — D. Lawrence Tarazano
*Assistant Examiner* — Stephanie Cox
(74) *Attorney, Agent, or Firm* — Patterson Thuente Pedersen, P.A.

(57) ABSTRACT

A tea kettle and related methods for preparing an optimally flavored hot tea. The tea kettle is capable of heating water for steeping tea leaves and steeping the packaged or loose leaf tea leaves within the tea kettle. The tea kettle can include an integrated heating element for heating the water. The tea kettle includes an integrated thermometer and can include an integrated timer for tracking the water temperature and steep time respectively so as to insure that the tea leaves steep at the proper temperature and duration of time. The tea kettle can include a detachable mesh infuser that attaches to a lid of the tea kettle for holding tea leaves during steeping.

15 Claims, 16 Drawing Sheets

U.S. PATENT DOCUMENTS

| | | | |
|---|---|---|---|
| RE37,173 E | 5/2001 | Jefferson, Jr. et al. | |
| D442,014 S | 5/2001 | Haring et al. | |
| D444,988 S | 7/2001 | Conran | |
| 6,283,013 B1 * | 9/2001 | Romandy et al. | 99/322 |
| 6,431,056 B1 * | 8/2002 | Fritschi | 99/320 |
| 6,561,390 B2 | 5/2003 | Boyte et al. | |
| 6,612,224 B2 | 9/2003 | Mercier et al. | |
| D500,627 S | 1/2005 | Ranzoni | |
| D506,635 S | 6/2005 | Krent et al. | |
| 6,964,222 B1 | 11/2005 | Tucker | |
| D541,099 S | 4/2007 | Lebowitz | |
| 7,219,600 B1 * | 5/2007 | Haven et al. | 99/318 |
| D555,427 S | 11/2007 | Picozza et al. | |
| 7,594,469 B2 * | 9/2009 | O'Connor et al. | 99/282 |
| 2004/0056027 A1 * | 3/2004 | Miller | 219/725 |
| 2008/0060526 A1 * | 3/2008 | Gilbert | 99/289 D |
| 2008/0216664 A1 * | 9/2008 | Koon et al. | 99/280 |
| 2008/0274246 A1 * | 11/2008 | Glucksman et al. | 426/425 |
| 2010/0305903 A1 * | 12/2010 | Sharpe | 702/176 |
| 2011/0056386 A1 * | 3/2011 | Taketani | 99/317 |

OTHER PUBLICATIONS

Presto Heat'n Steep Electric Tea Kettle. http://www.gopresto.com/products/products.php?stock=02704 Jun. 20, 2011.*

Presto Heat'n Steep Electric Tea Kettle Manual. http://www.gopresto.com/downloads/instructions/02704.pdf Jun. 20, 2011.*

Presto® Whistling Electric Tea Kettle Instructions, 2003, 3 pages.

* cited by examiner

TEA KETTLE WITH DETACHABLE INFUSER AND INTEGRATED THERMOMETER

FIELD OF THE INVENTION

The invention relates generally to tea kettles for heating water and steeping packaged or loose leaf tea leaves. More specifically, the present invention relates to a tea kettle having a removable infuser and an integrated thermometer allowing users to prepare an optimally flavored tea by accurately steeping the tea leaves in the tea kettle at the correct temperature for the appropriate duration of time.

BACKGROUND OF THE DISCLOSURE

Tea is one of the most commonly consumed beverages in the world and comes in four basic varieties: black, oolong, green and white tea. Tea is traditionally prepared by steeping tea leaves in hot water for a given duration of time until the flavors of the tea leaves are leached into the water. Optimal tea flavors can only be obtained if the tea leaves are steeped in water at the correct temperature and for an appropriate duration of time at that temperature. Each of the basic varieties of teas has different desired water temperatures and steep times required to obtain the optimal tea favors. Specific types of teas can have even more stringent temperature and time requirements to produce an optimally flavored tea.

Typically, tea is prepared by separately heating the water to the desired temperature before adding the hot water to the tea leaves contained in a separate container. Tea can also be prepared by placing the tea leaves in a mesh infuser that is submerged into preheated water. While either method effectively steeps the tea leaves, neither method insures that the hot water is the appropriate temperature for the specific tea variety when the tea leaves are submerged or that the tea leaves are steeped for the correct amount of time.

In addition to the temperature and time considerations in preparing an optimal flavored tea, a parallel concern is minimizing the number of kitchen implements required to prepare the tea. While thermometers and kitchen timers can be used to provide the necessary information regarding water temperature and steep time, a thermometer and timer are additional tools that must be retrieved and replaced in order to properly brew the tea, followed by subsequent cleaning. Additionally, if the tea is being prepared outside the kitchen or at a remote location, the additional kitchen implements may not be readily available or difficult to transport. Similarly, if the tea is being prepared at a remote location, a heat source may not be readily available to heat the water to the desired temperature.

As such, there exists a need for further improvement to a tea making device and related methods of preparing optimally flavored tea.

SUMMARY OF THE DISCLOSURE

Embodiments of the present disclosure relate to a tea kettle for steeping packaged or loose leaf tea. More specifically, representative embodiments include a tea kettle having an integrated heating element for heating the water as well as integrated thermometer and an integrated timer for tracking water temperature and steep time respectively. The integration of the heating element, thermometer and timer into the tea kettle consolidates the number of kitchen implements necessary to prepare an optimally flavored tea.

In one representative embodiment, a tea kettle can comprise a kettle, a lid and an integrated heating element. The kettle can further comprise an integrated thermometer having a display on an exterior portion of the kettle and a probe for measuring the water temperature within the kettle. A thermometer display provides a read out of the current water temperature in the kettle and visually indicates when the water has reached the desired temperature. The kettle can also comprise a fill opening for filling the tea kettle with water.

Generally, a lid is adapted to fit over the fill opening and can further comprise an integrated timer for measuring a steep time of the selected tea leaves. The timer can be set to run for different durations of time depending on the variety of tea leaves to be steeped. The lid can further comprise a heat shield to protect the timer from the radiant heat generated by the heating element or heat absorbed by the water. The lid can also be adapted to interlock with a mesh infuser. The mesh infuser can be removed from the lid while the water is being heated and reattached once the water has reached the desired temperature. The mesh infuser can further comprise a basket adapted to receive and steep both loose leaf and packaged tea leaves. Packaged tea leaves refer to tea leaves that are packaged into individual pouches for preparing a given quantity of tea and are typically porous, such as, for example, a conventional tea bag. Porous pouches allow hot water to steep the tea leaves while preventing the tea leaves from leaving the tea kettle when tea is poured from the tea kettle. Loose leaf tea refers to tea leaves that are not pre-packaged into individual pouches, thereby allowing users to select the amount of tea leaves to steep.

The heating element can further comprise an electric heat source and an electric cord adapted for plugging into an electrical outlet. The electric heat source is capable of heating the water within the kettle to the desired temperature. Alternatively, the heating element can be adapted to provide a lower level of heat to the water or prepared tea to maintain the water or tea at a consumption temperature.

In one representative embodiment, a tea kettle can further comprise a mesh infuser that is removably attached to the lid. Typically, tea leaves are only added to the water after the water has reached the desired temperature. Similarly, tea leaves can be removed from the water after steeping is completed to end the steeping process at the optimal flavor. The removable mesh infuser allows users to use the lid without the mesh infuser to cover the fill opening when the water is being heated to reduce heating time or while tea is being served from the tea kettle to reduce spilling. The removable mesh infuser also allows users to fill the mesh infuser with tea leaves while the water is being heated, thereby reducing preparation time.

In yet another representative embodiment, a method for preparing tea can comprise selecting a variety of tea to be prepared. Next, water can be heated within a kettle until a visual temperature display indicates that a suitable temperature has been reached for steeping the selected tea. A lid assembly can be removed from the kettle wherein the tea, either in packaged or loose form, can be placed within a mesh infuser that is part of the lid assembly. The lid assembly can be reattached to the kettle such that the mesh infuser is submerged within the heated water and steeping of the tea can commence. The steeping time can be monitored with a timer that is integral to the kettle such that the tea is steeped for an appropriate amount of time that pertains to the particular tea variety. Finally, the lid assembly can be removed and the mesh infuser detached from the lid assembly whereby the prepared tea can be poured from the tea kettle and consumed by an individual.

The above summary of the invention is not intended to describe each illustrated embodiment or every implementation of the present invention. The Figures and the Detailed Description that follow more particularly exemplify these embodiments.

BRIEF DESCRIPTION OF THE FIGURES

The invention can be more completely understood in consideration of the following detailed description of various embodiments of the invention in connection with the accompanying drawings, in which.

Figure 1:
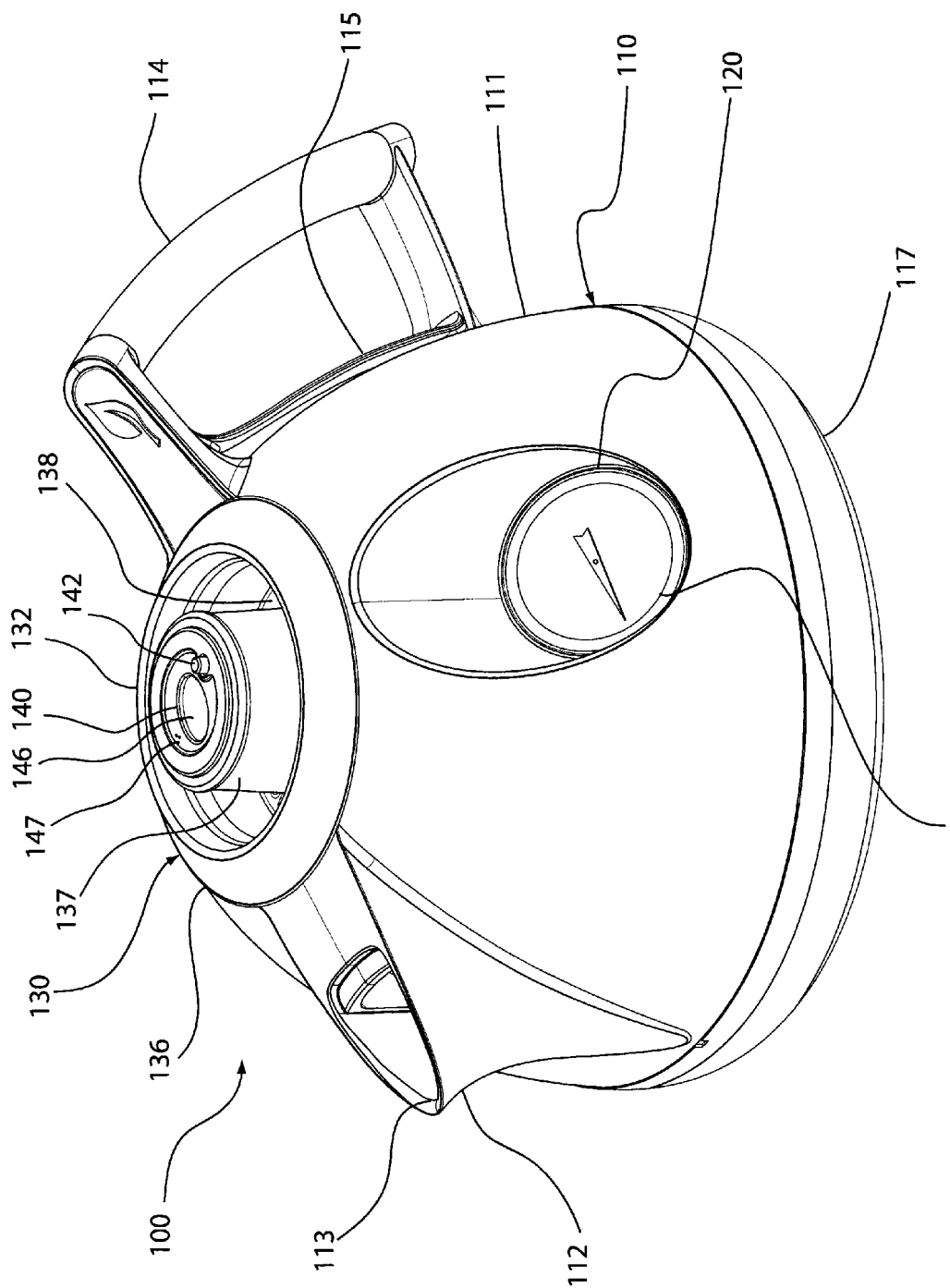
FIG. 1 is a perspective view of a representative embodiment of a tea kettle according to the present disclosure.
Figure 2:
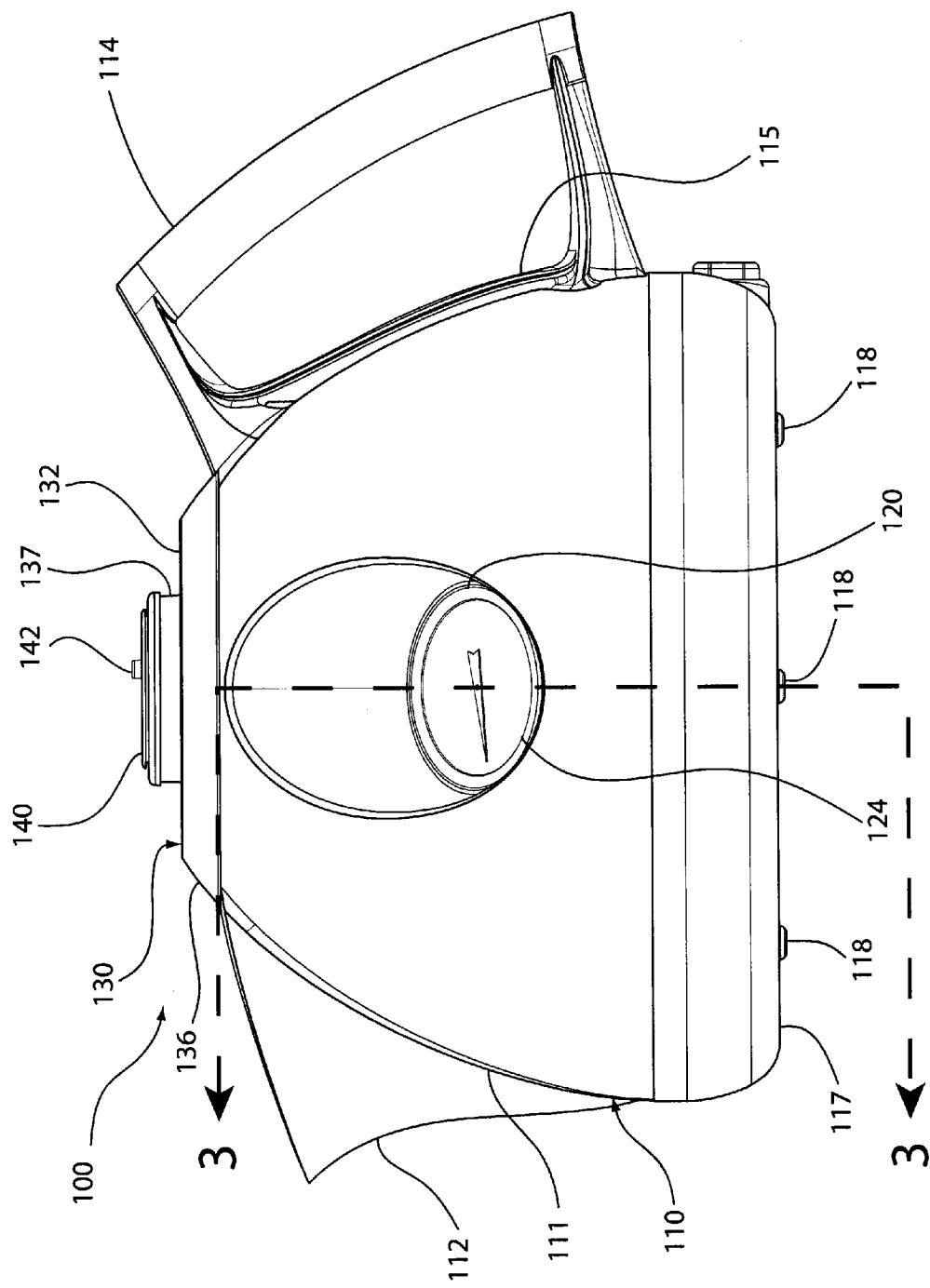
FIG. 2 is a side view of the tea kettle of FIG. 1.
Figure 3:
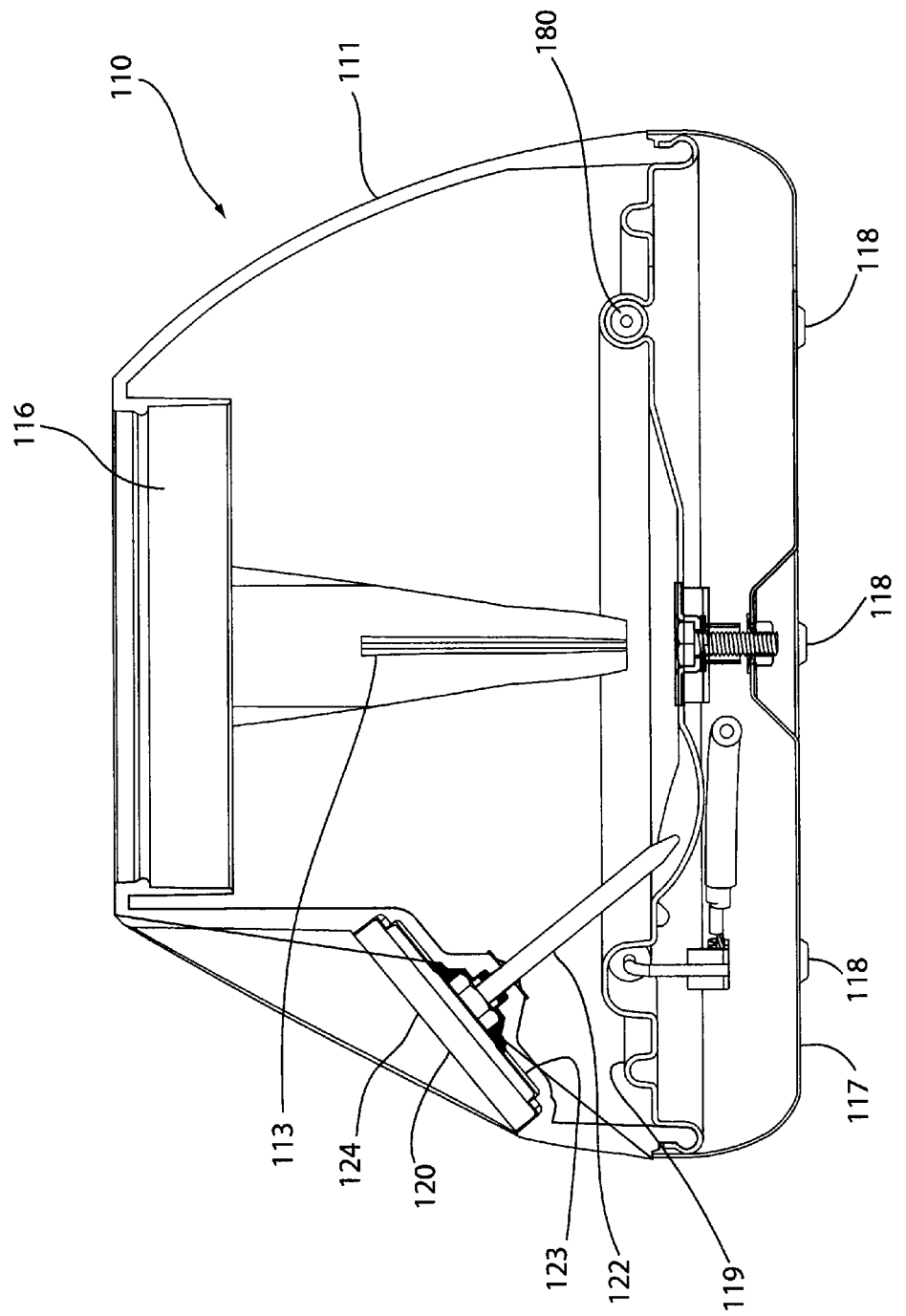
FIG. 3 is a sectional view of a kettle taken at line 3-3 of FIG. 2.
Figure 4:
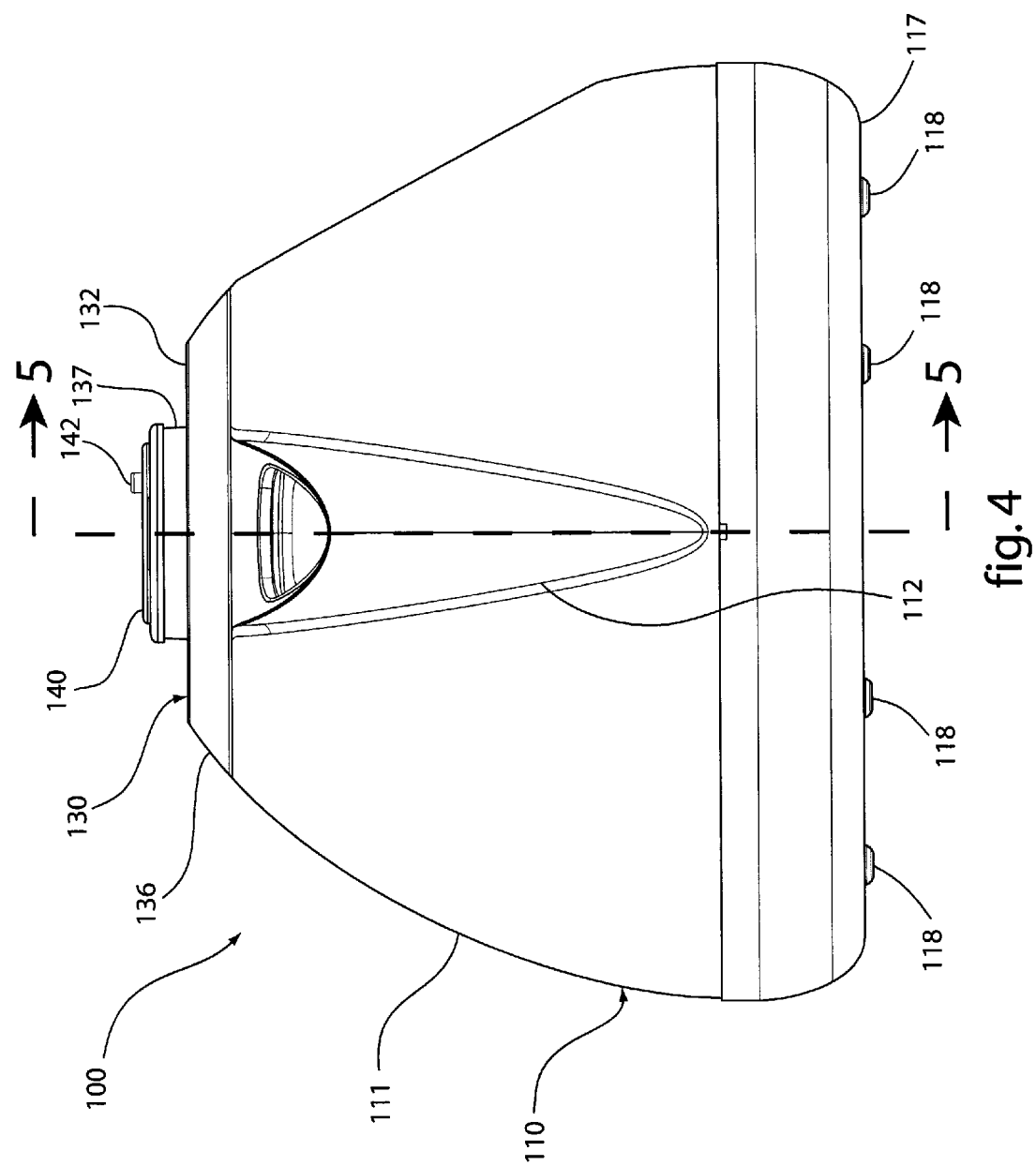
FIG. 4 is a front view of the tea kettle of FIG. 1.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE FIGURES

As illustrated in FIGS. 1-7 and 16, a representative embodiment of a tea kettle 100 according to the present invention generally comprises a kettle 110 and a lid 130. The kettle 110 further comprises a kettle wall 111, a spout 112, a handle 114, a fill opening 116 and an integrated thermometer 120. The lid 130 further comprises a top 132, a bottom 134, a lid edge 136 and a timer housing 137. In one representative embodiment, the tea kettle 100 can further comprise an integrated heating element 180 further comprises a cord receptacle 184 for connecting to an electrical source.

As shown in FIGS. 1-7, kettle 110 is adapted to receive and hold a quantity of water while the water is heated or tea leaves are steeped in the water as well as the finished tea. The kettle wall 111 can be constructed of a suitable rigid material such as, for example, metal, plastic, ceramic or any other like material or combination thereof that are capable of retaining water over a range of temperatures. Similarly, the kettle 110 can be insulated or un-insulated. A handle 114 is affixed to the kettle 110 allowing users to orient the kettle 110 via the handle 114 instead of touching the kettle wall 111, which can have an elevated temperature due to hot water within the kettle 110 or the integrated heating element 180. Alternatively, the handle 114 can further comprise a hand guard 115 disposed between the handle 114 and kettle wall 111 and adapted to prevent the user's hand from contacting the kettle wall 111 while gripping the handle 114. The spout 112 defines an opening in the kettle wall 111 allowing water to be poured from the kettle 110 and a chute 113 guiding the water poured from the kettle 110. The fill opening 116 is disposed at the top of tea kettle 100 and is adapted to allow users to fill the kettle 110 with water. Kettle 110 has a generally flat bottom surface 117. In some embodiments, bottom surface 117 can include a plurality of feet 118 to lift the bottom surface 117 from direct contact with a support surface such as, for example, a kitchen counter or table. Kettle 110 further comprises a kettle floor 119 that physically separates a liquid retaining portion of kettle 110 from a base portion. Kettle floor 119 can be fabricated so as to be in close proximity to integrated heating element 180 such that heat from the integrated heating element 180 is efficiently conducted into the liquid retaining portion of kettle 110.

The integrated thermometer 120 of the kettle 110 generally included further comprises a temperature sensing element 122 projecting into the kettle 110 and a display 124. The integrated thermometer 120 is disposed on the kettle wall 111 and can be flush with the surface of the kettle wall 111 or project outwardly. Alternatively, the kettle 110 can comprise a recess 123 in the kettle wall 111 adapted to receive the integrated thermometer 120. The temperature sensing element 122 generally extends through the kettle wall 111 to directly contact the water within the kettle 110 or can measure the water temperature through the kettle wall 111 and adjust for the indirect measurement. The temperature sensing element 122 can be a bi-metal thermometer, a thermocouple, an alcohol or mercury thermometer, or any other form of suitable temperature measuring device. The display 124 is operationally connected to the temperature sensing element and visually provides the user with the current water temperature measured by the temperature sensing element 122. The display 124 indicates the current water temperature during both the heating of the water and the steeping of the tea leaves and indicates when the water temperature is outside the desired temperature range for steeping. The display 124 can comprise a mechanical display, a digital display or a combination thereof.

Lid 130 is adapted for removable placement over the fill opening 116 with the lid edge 136 overlapping the edges of the fill opening 116, thereby allowing the lid 130 to fully cover and seal the fill opening 116. Alternatively, the lid 130 can further comprise a channel 138 at the top 132 of the lid 130 allowing a user to grasp a portion of the lid 130 to lift the lid off the kettle 110 or place the lid 130 on the kettle 110.

Timer housing 137 generally defines a mounting cavity 139 into which an integrated timer 140 can be operably mounted. The integrated timer 140 further comprises a steep time selector 142. The steep time selector 142 is adapted to allow the user to select a steep duration time for which the tea leaves should be steeped. The steep duration time will vary based on the type of tea being prepared, for example, green tea versus white tea Alternatively, the steep time selector 142 can also be adapted to allow users to input the variety of tea leaves to be steeped in the tea kettle 100. If the variety of tea leaves is provided to the integrated timer 140, the integrated timer 140 will run for a predetermined time set for that particular type of tea leaves rather than according to a user set duration of time. The steep time selector 142 can comprise a rotatable dial, a digital input, or a mechanical switch. In the event that steep timer selector 142 comprises a digital input or button, a user can select the steep time by pressing the button once to add a minute to the steep time. For example, pressing the steep time selector 142 will select one minute while pressing the steep time selector 142 three times will select a three minute steep duration time. Once the steep time selector 142 goes unpushed for a period of three seconds or longer, the integrated time will begin counting down the selected steep duration time. Alternatively, the timer 140 can further comprise a visual indicator 146 adapted to signal users when the tea leaves have steeped for the set time or the predetermined period of time for that particular type of tea leaves. The timer 140 can further comprise an audio indicator 147 such as, for example, chimes, buzzers or any other sound producing device. Visual indicator 146 can comprise a light, a digital readout or any other visual display producing device.

Figure 5:
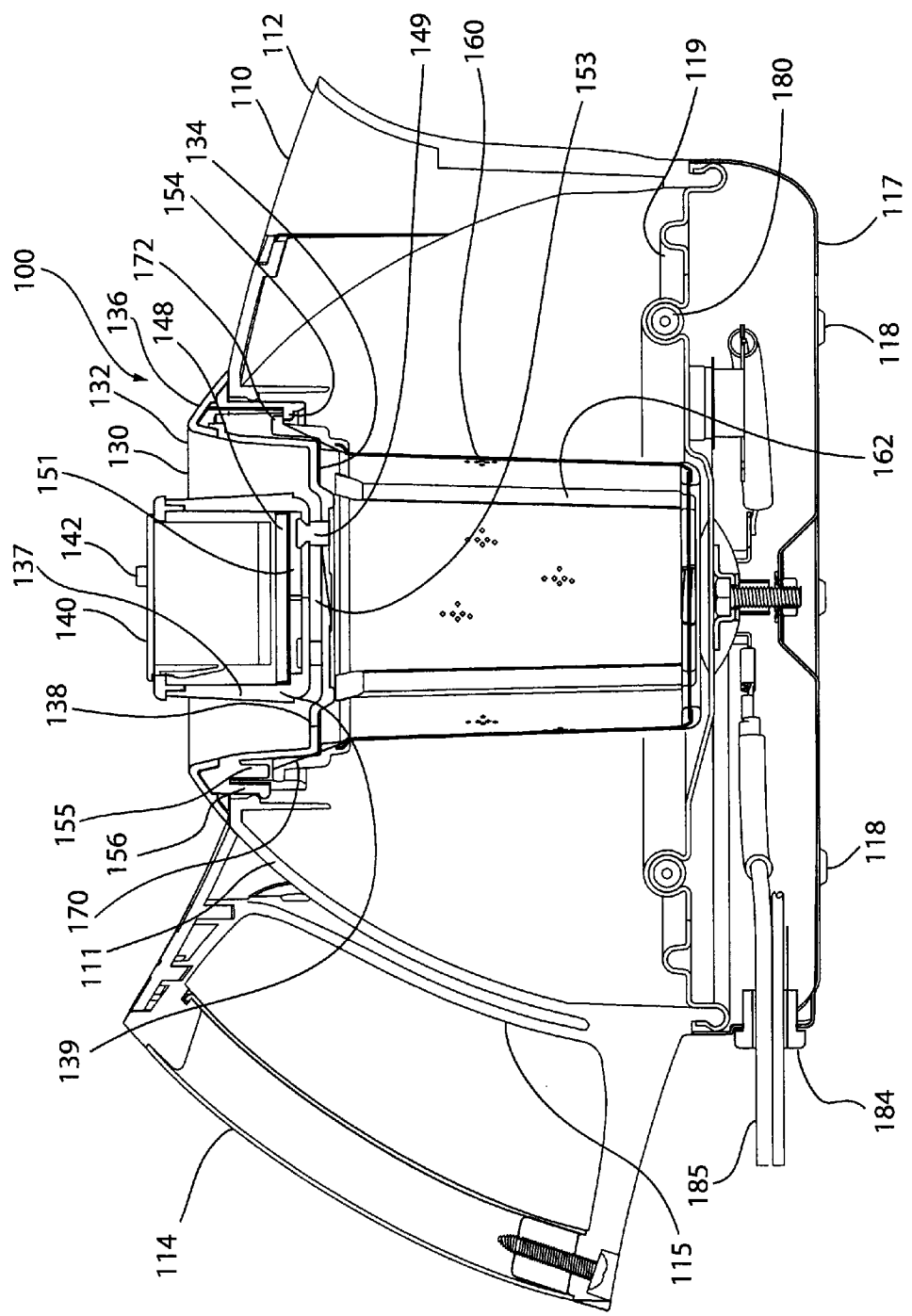
FIG. 5 is a sectional view of the tea kettle of FIG. 1 taken at line 5-5 of FIG. 4.
Figure 6:
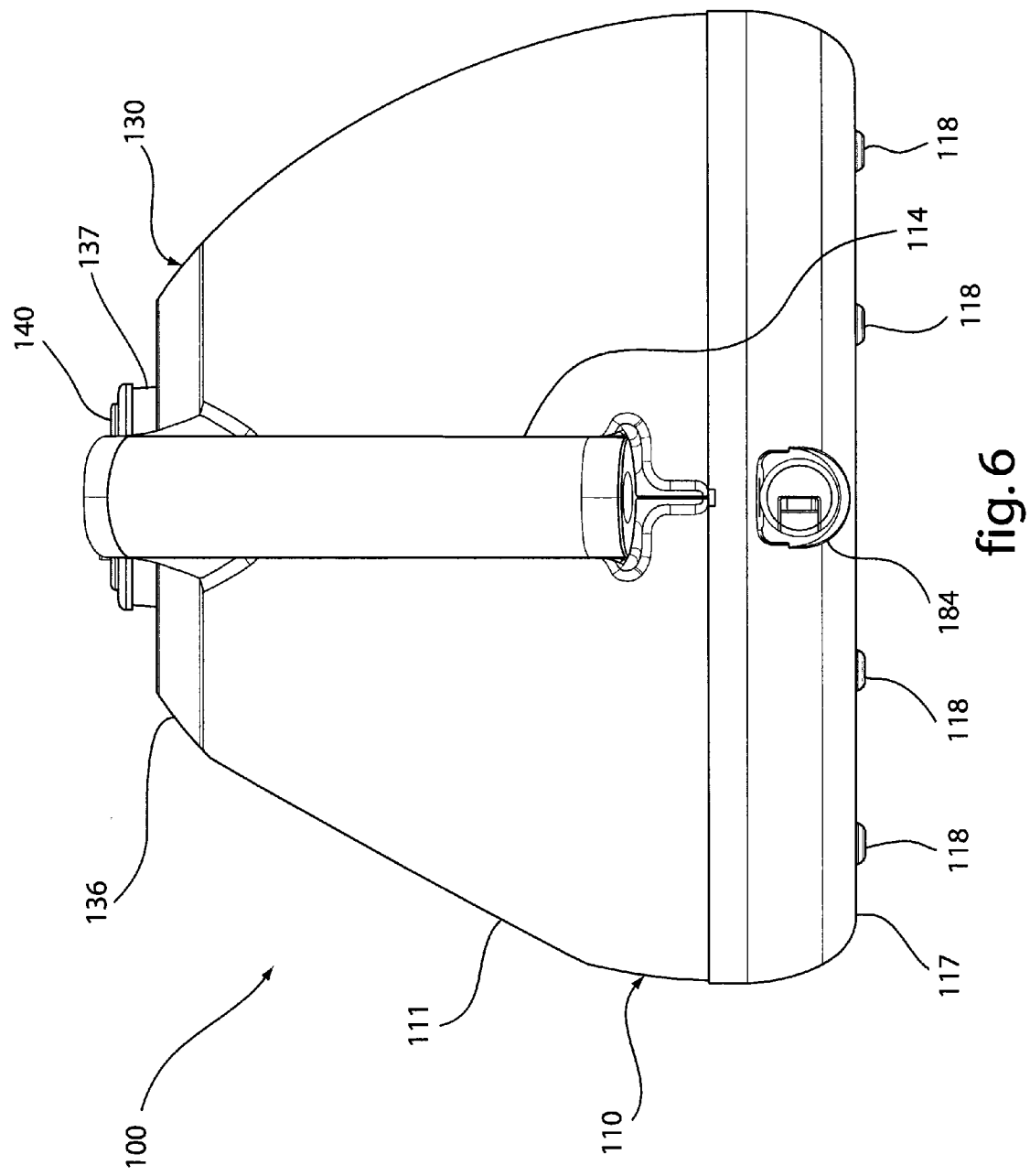
FIG. 6 is a rear view of the tea kettle of FIG. 1.
Figure 7:
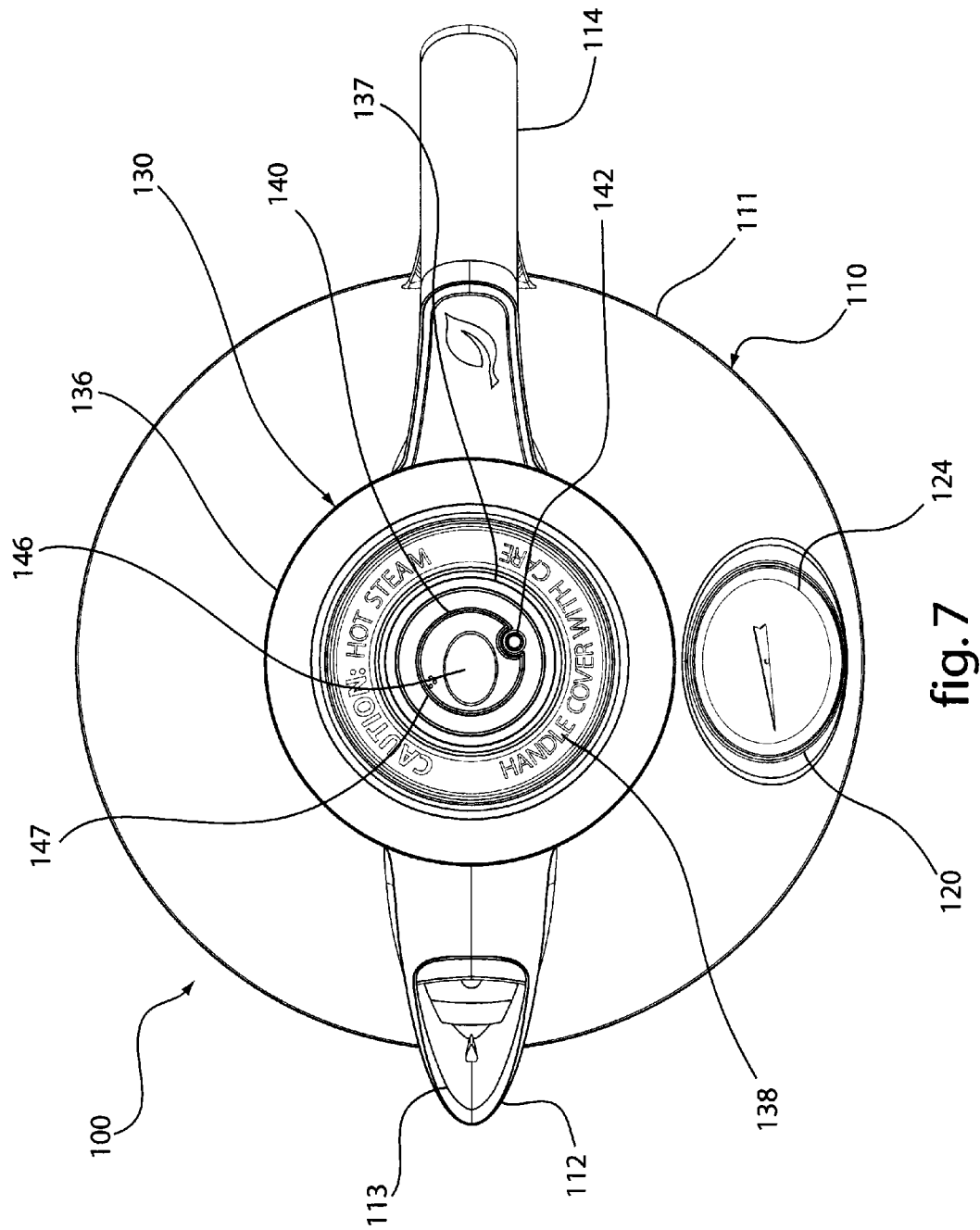
FIG. 7 is a top view of the tea kettle of FIG. 1.
Figure 8:
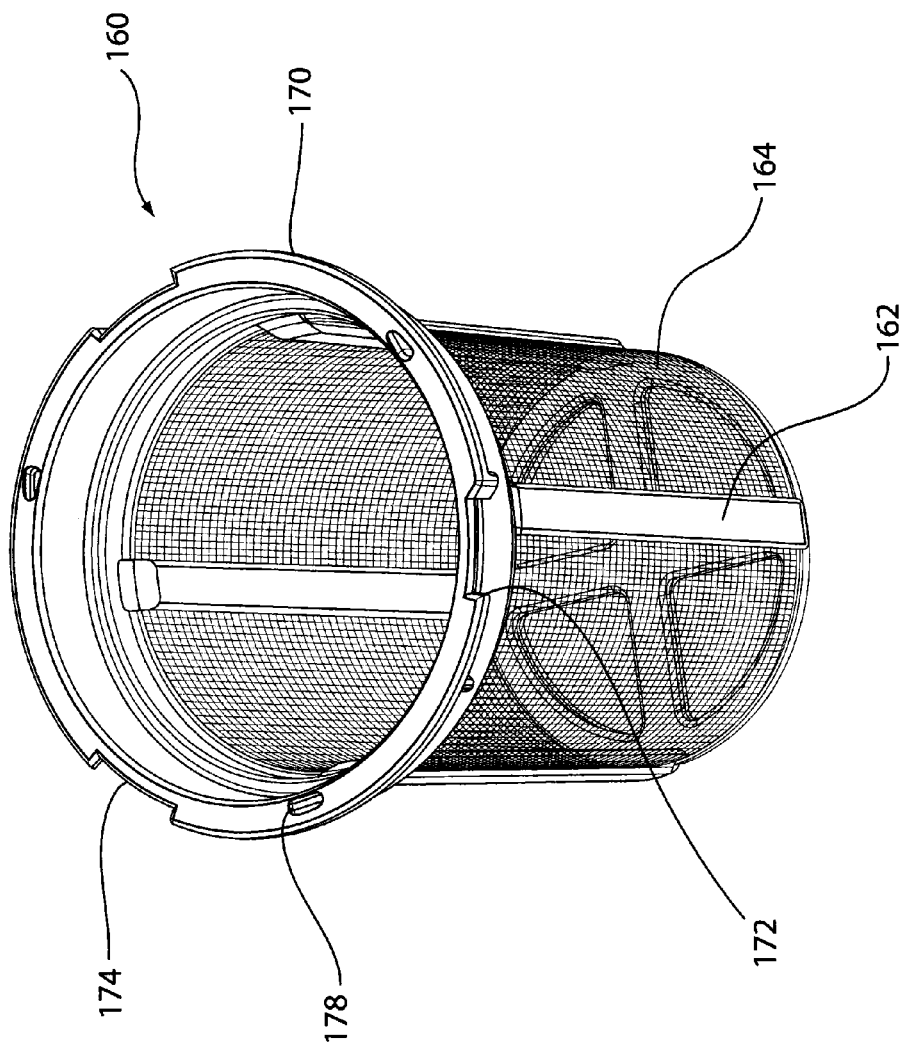
FIG. 8 is a top perspective view of a representative embodiment of a mesh infuser according to the present invention.
Figure 9:
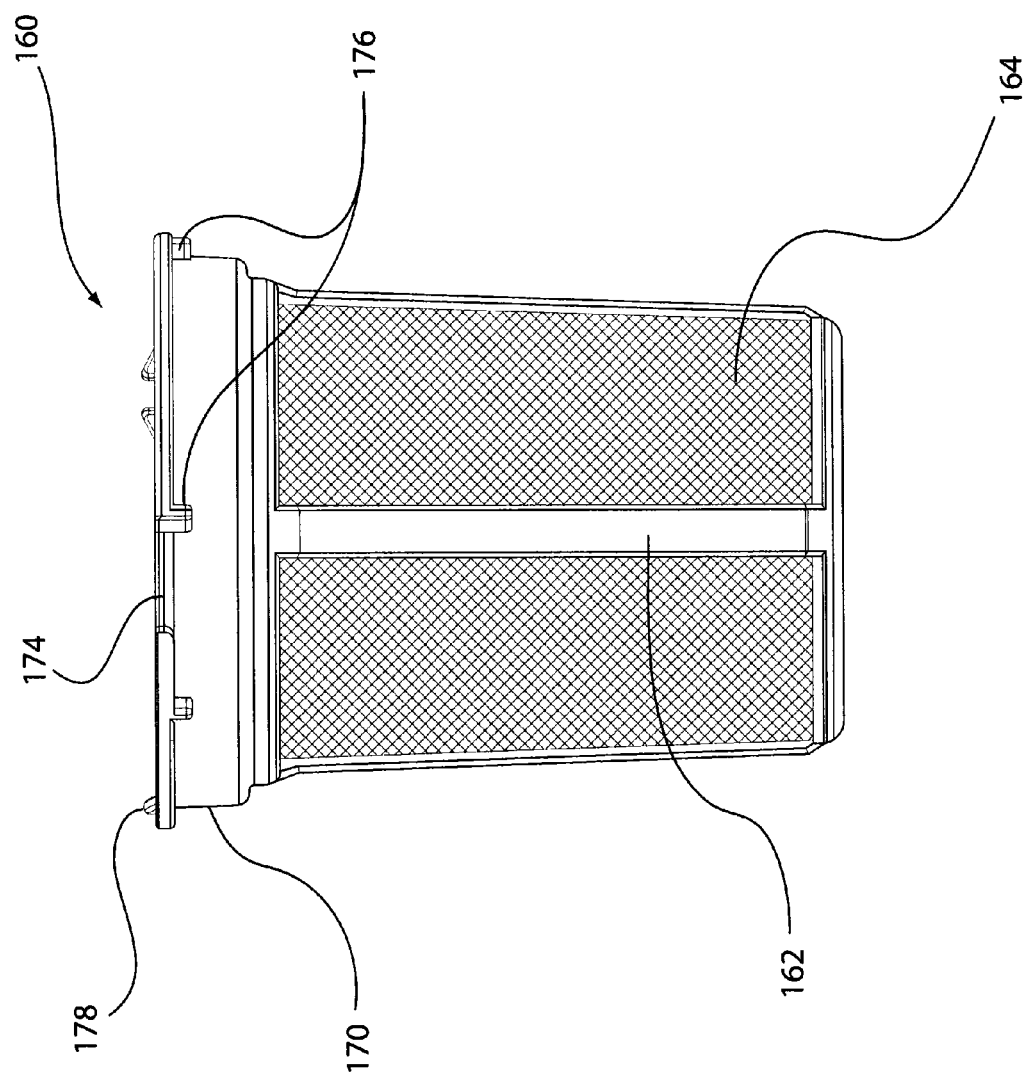
FIG. 9 is a side view of the mesh infuser of FIG. 8.
Figure 10:
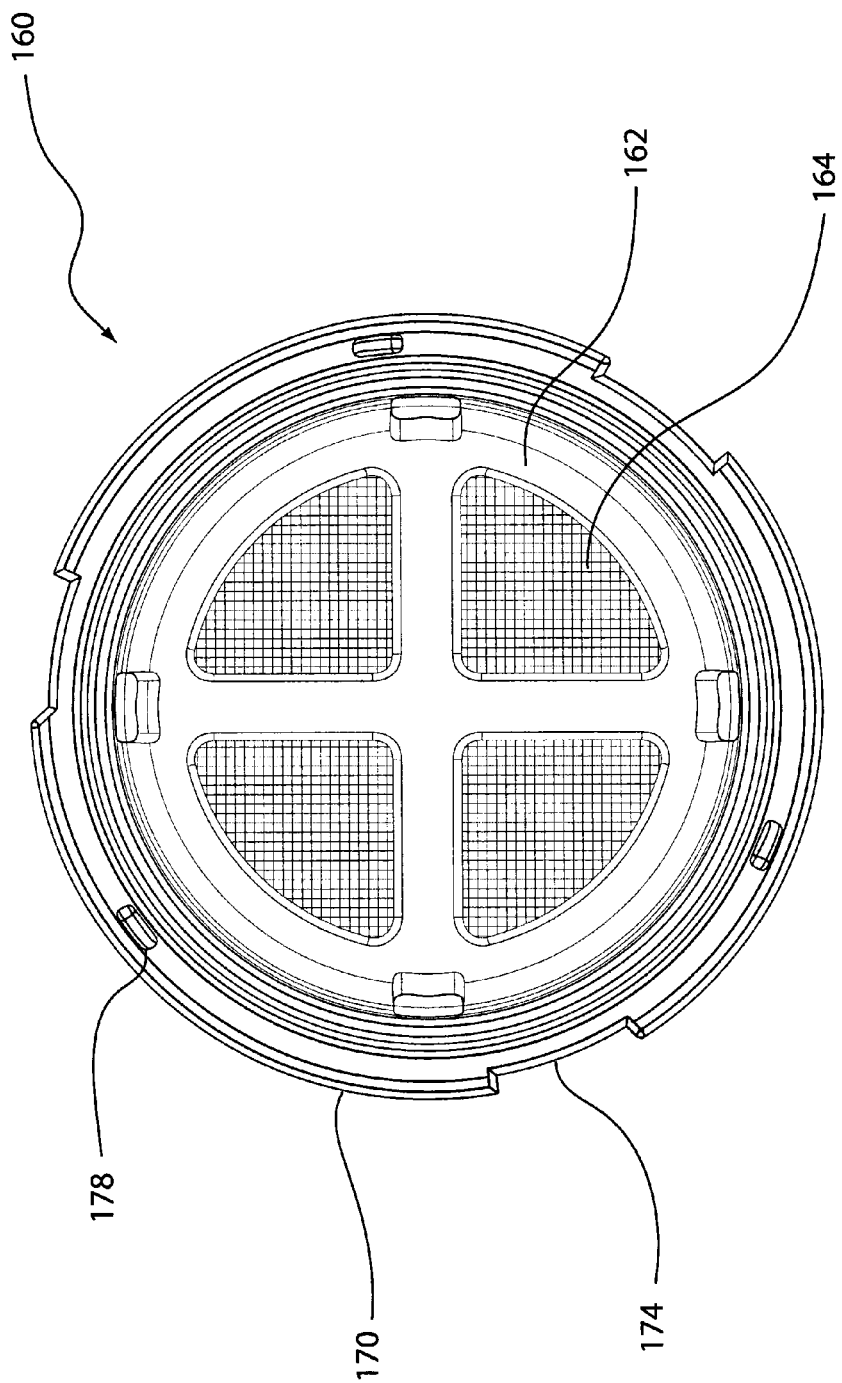
FIG. 10 is a top view of the mesh infuser of FIG. 8.
Figure 11:
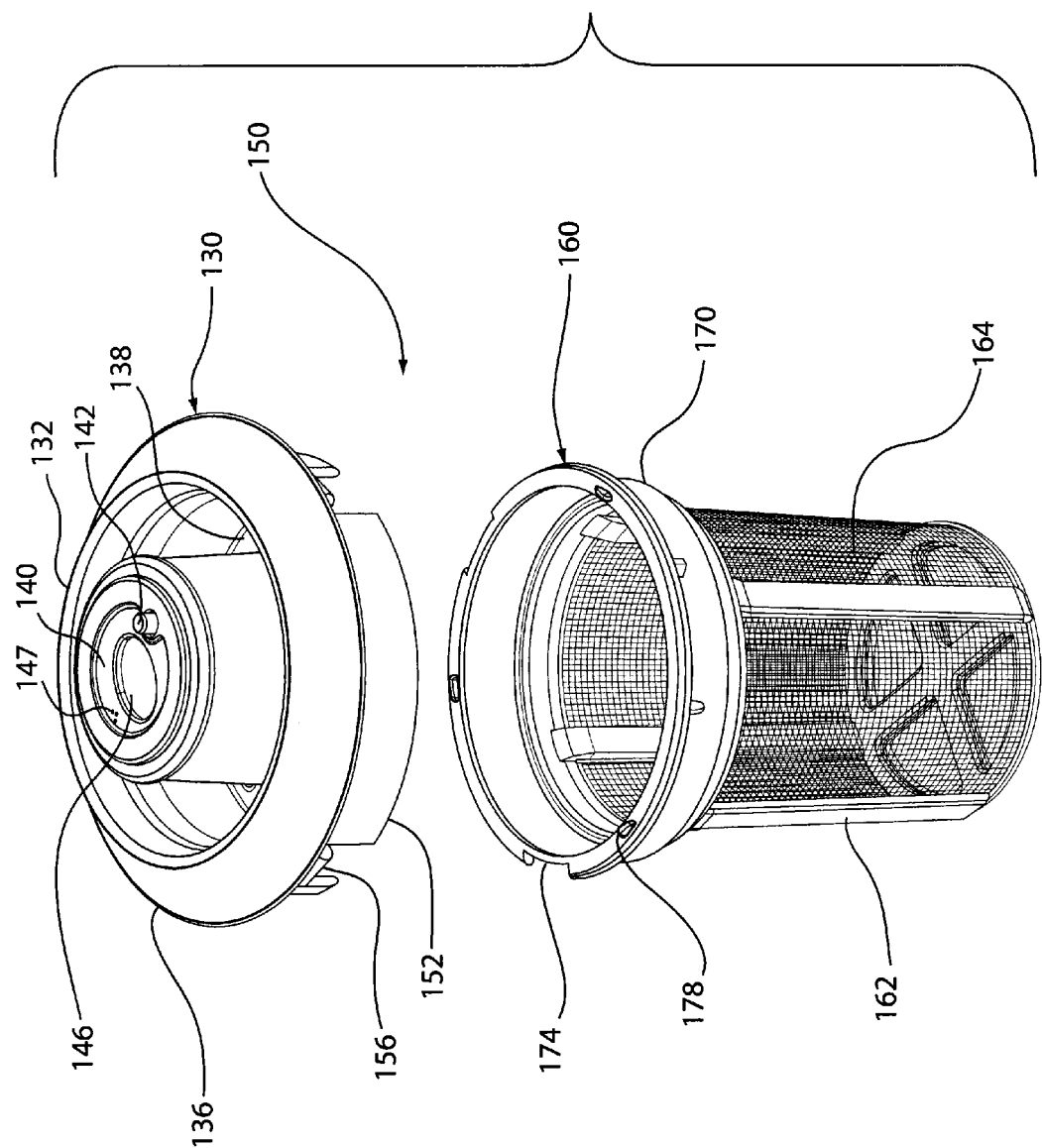
FIG. 11 is an exploded perspective view of a representative embodiment of a lid assembly according to the present invention.
Figure 12:
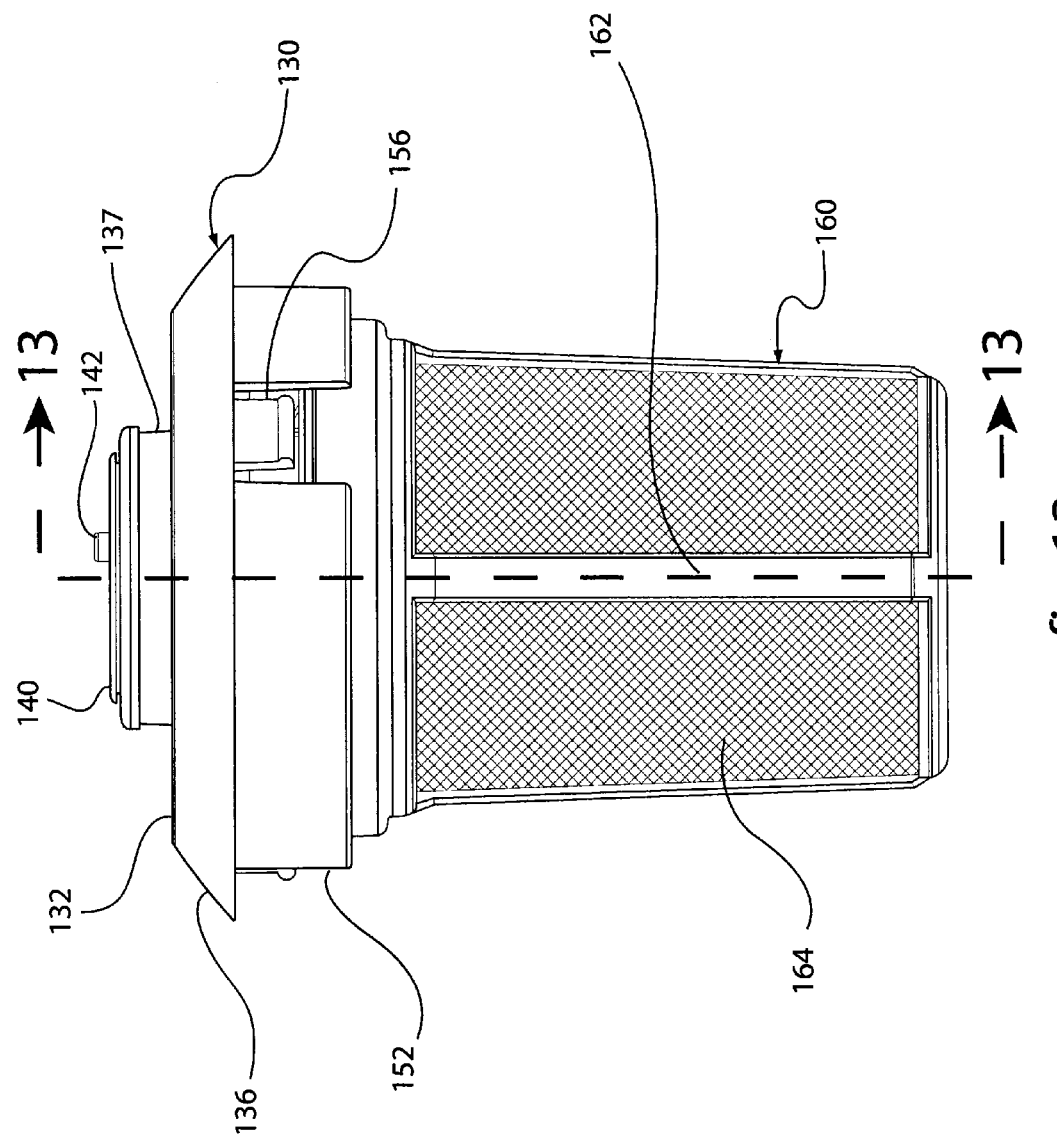
FIG. 12 is a side view of the lid assembly of FIG. 11
Figure 13:
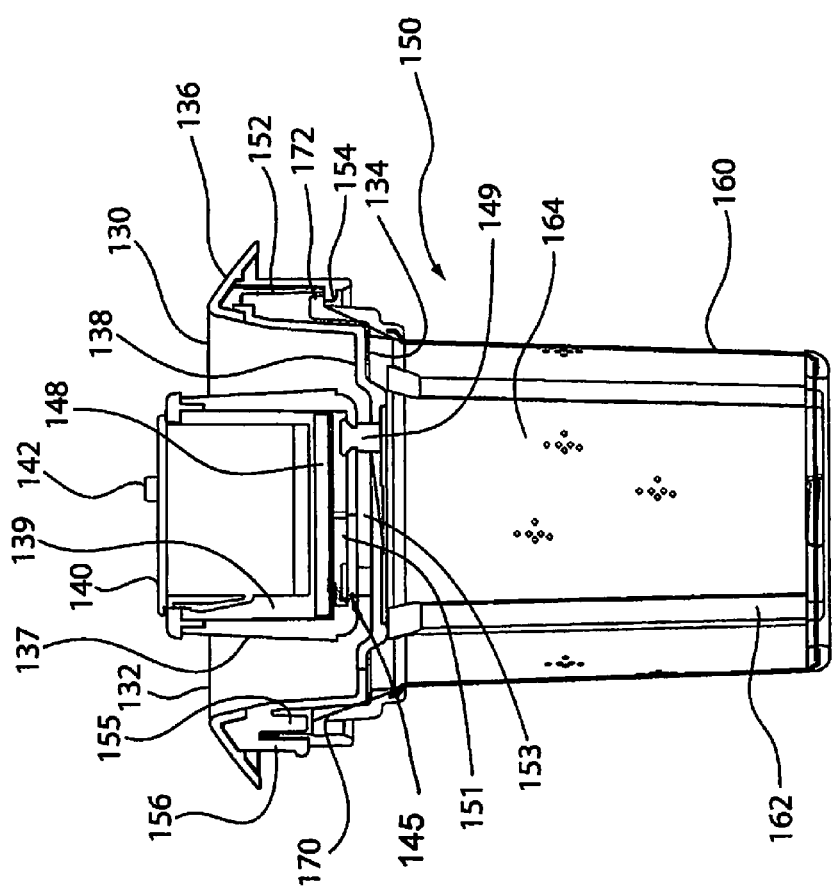
FIG. 13 is a sectional view of the lid assembly of FIG. 11 taken at line 13-13 of FIG. 12.
Figure 14:
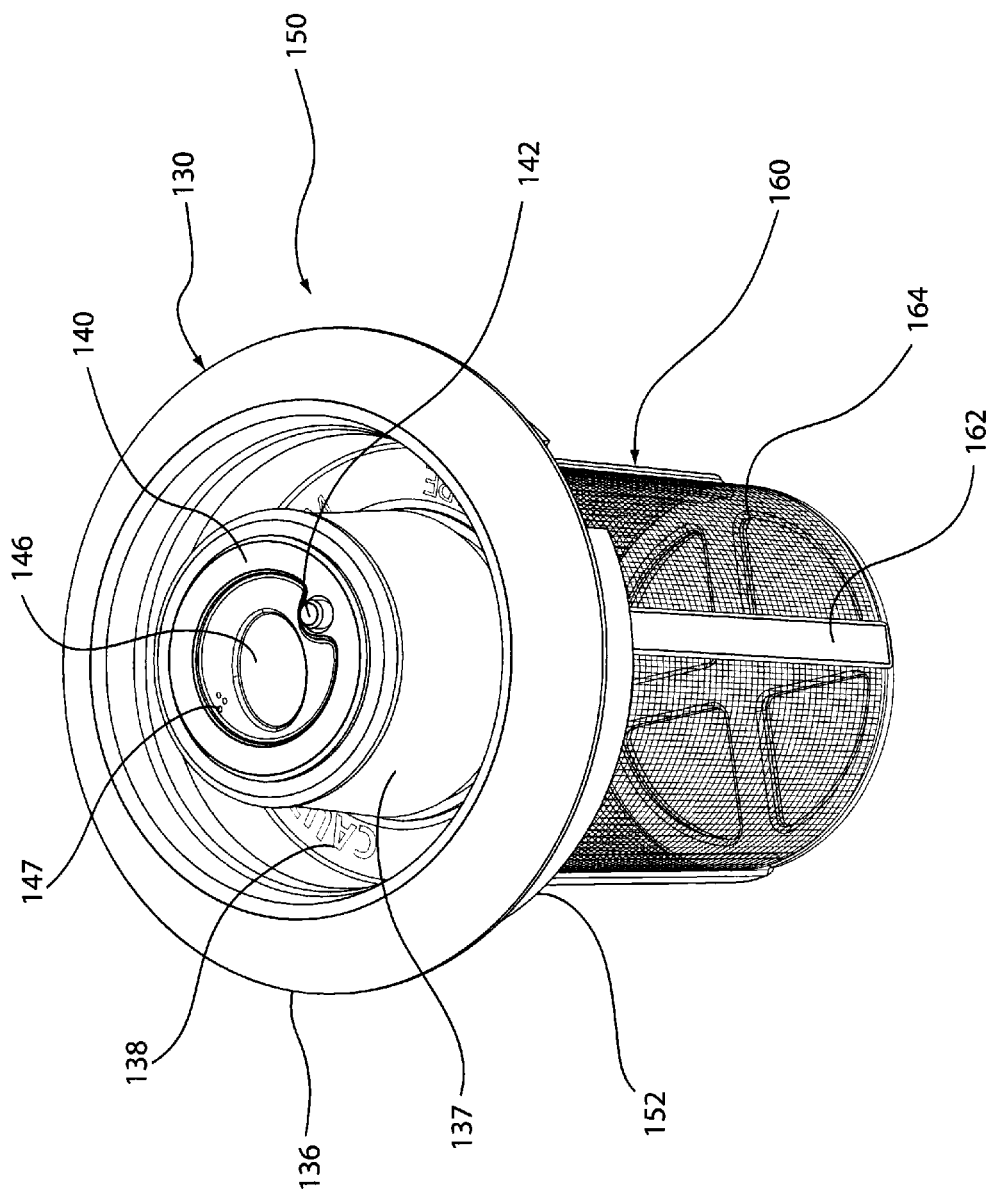
FIG. 14 is a top perspective view of the lid assembly of FIG. 11.
Figure 15:
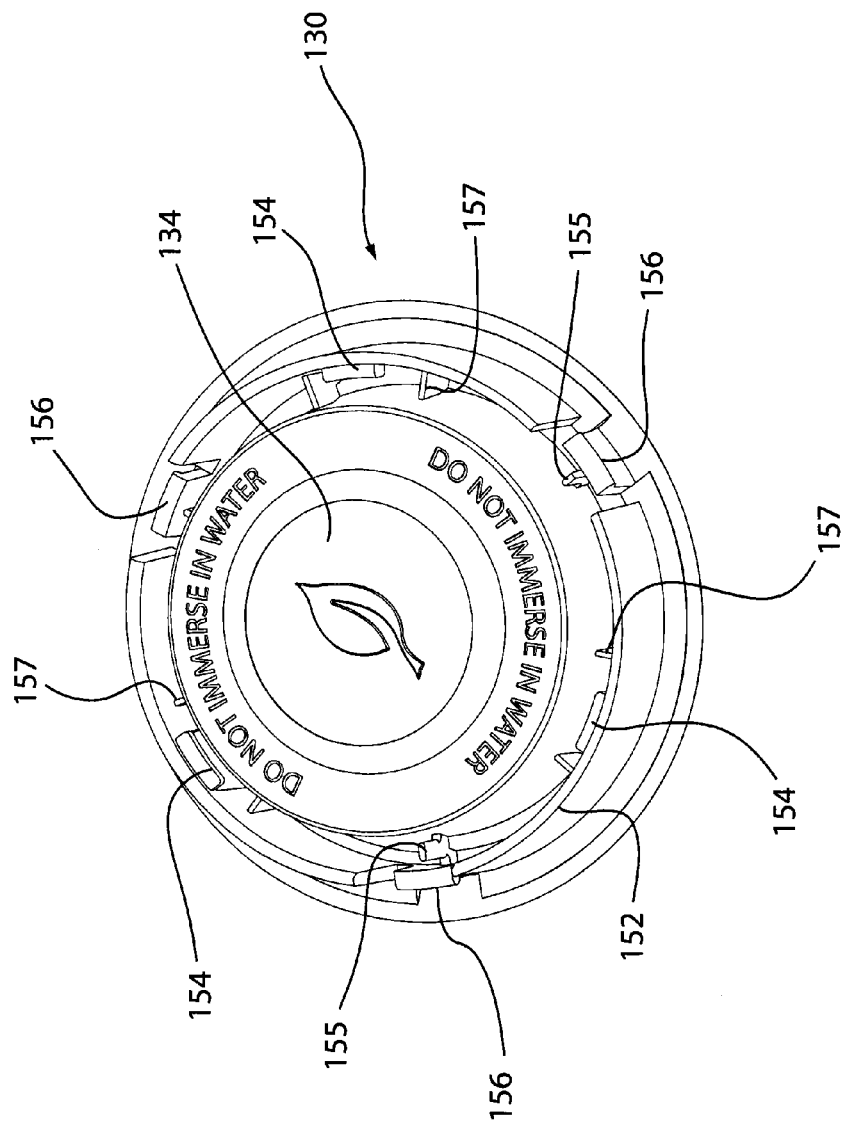
FIG. 15 is a bottom perspective view of a representative embodiment of a lid according to the present invention.
Figure 16:
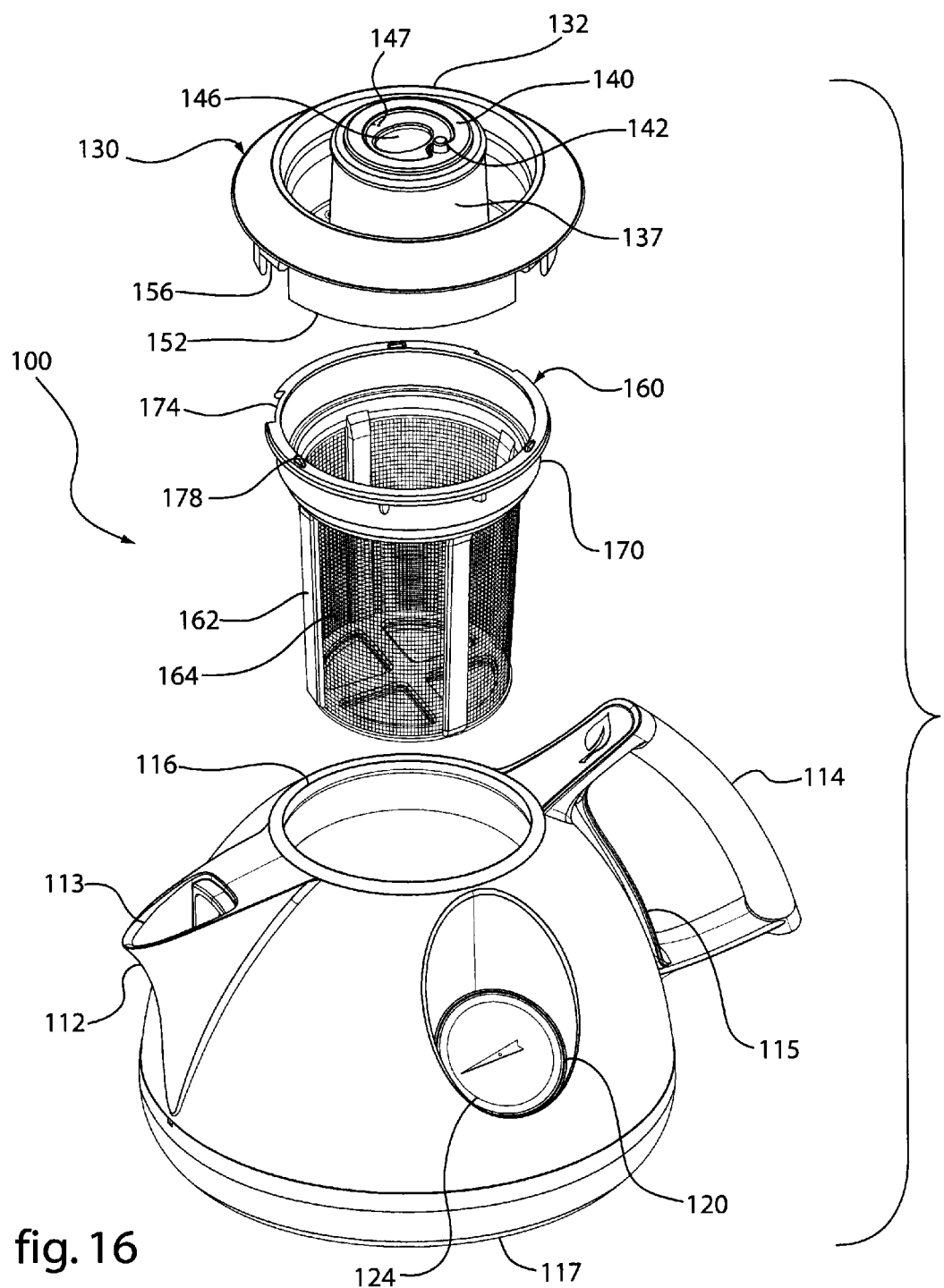
FIG. 16 is an exploded, top perspective view of the tea kettle of FIG. 1.

Referring to FIGS. 5 and 13, timer housing 137 can further comprise a heat shield 148 preventing the heat radiated by the integrated heating element 180 or absorbed by the water from damaging the integrated timer 140. The heat shield 148 can comprise insulating materials, vacuum insulation and a reflective metallic surface or any other insulating or heat deflecting materials capable of insulating against or reflecting away sufficient heat so as to prevent damage to the timer. Heat shield 148 can be assisted by an air gap 151 defined between the heat shield 148 and a housing floor 145 of timer housing 137. Air gap 151 prevents direct conduction of heat from the housing floor 145 to heat shield 148. In addition, a plurality of stand off's 149 physically support the timer housing 137 above the bottom 134 of lid 130 to create a circulation gap 153 between the timer housing 137 and the lid 130. Circulation gap 153 allows for air to pass below the timer housing 137 so as to provide additional heat removal from the area proximate the integrated timer 140. The presence of both air gap 151 and circulation gap 153 cooperatively function to reduce the amount of heat conducted or otherwise transferred to integrated timer 140.

The integrated heating element 180 is in operational contact with the bottom of the kettle 110 and is adapted to radiate heat through the kettle 110 into the water contained within the kettle 110. The cord receptacle 184 is adapted to receive an electrical cord 185 plugged into a wall outlet. Once connected, the integrated heating element 180 is adapted to generate radiant heat from electricity received from the wall outlet. Integrated heating element 180 is adapted to provide sufficient radiant heat to bring the water up in temperature to the desired water temperature. Alternatively, the integrated heating element 180 can be adapted to also provide lower levels of radiant heat to maintain the water or prepared tea at a desired consumption temperature. In an alternative embodiment, tea kettle 100 can be adapted for stove top heating on a gas or electric burner, wherein the integrated heating element 180 is absent from kettle 110 and bottom surface 117, absent feet 118, is placed directly on the burner to receive heat for heating the water.

As illustrated in FIGS. 5-16, tea kettle 100 can further comprise a mesh infuser 160. The mesh infuser 160 generally includes a basket frame 162, a mesh basket 164, and an interlocking ring 170. The mesh basket 164 is adapted to receive both loose leaf and packaged tea leaves and to retain the tea leaves within the mesh infuser 160 during steeping. The mesh of the mesh basket 164 is sufficiently fine to retain the majority of loose tea leaves within the mesh infuser 160 when water or tea is poured out of the kettle 110. The mesh basket 164 is adapted to be at least partially submerged in the hot water within the kettle 110 and is porous allowing the tea leaves contained within the mesh basket 164 to be steeped in the hot water.

The lid 130 and the mesh infuser 160 are adapted to releasably interlock to form a lid/infuser subassembly 150. Lid 130 can include an interlocking ring 152 having gripping lugs 154 adapted to grip the infuser interlocking ring 170. Lid 130 also includes snap lugs 155 adapted to interface with the interlocking ring 170. Lid 130 further includes locking tabs 156 for snap fitting within the fill opening 116. The infuser interlocking ring 170 further comprises an edge 172 having notches 174, stop tabs 176 and locking lugs 178. The subassembly 150 is assembled by fitting the gripping lugs 154 of the lid interlocking ring 152 through the notches 174 of the infuser interlocking ring 170. The lid 130 is then rotated relative to the mesh infuser 160 until the gripping lugs 154 contact stop tabs 176. At the same time, snap lugs 155 engage and snap past the locking lugs 178. Backup ribs 157 physically prevent the gripping lugs 154 from rotating beyond the stop tabs 176. The lid/infuser subassembly 150 is disassembled by twisting the lid 130 the opposite direction relative to the mesh infuser 160 until the gripping lugs 154 can be fitted through the notches 174 of the infuser interlocking ring 170.

The lid/infuser subassembly 150 is adapted to be placed over and seal the fill opening 116 such that the mesh infuser 160 is suspended below the lid 130 and is at least partially submerged within the hot water for steeping any tea leaves contained within the mesh infuser 160. Locking tabs 156 snap fit within the fill opening 116 to operably join the lid/infuser subassembly 150 to the kettle 110. As tea leaves are typically not added to the water until the water has reached the desired temperature, lid 130 can be placed over the fill opening 116 during heating without the mesh infuser 160 attached. Once the water has been heated, the mesh infuser 160 can then be attached and the subassembly 150 placed into the fill opening 116 to steep the tea leaves. After the tea has been prepared, the mesh infuser 160 can then be removed from the lid 130 at the user's discretion to stop the steeping process.

Although specific examples have been illustrated and described herein, it will be appreciated by those of ordinary skill in the art that any arrangement calculated to achieve the same purpose could be substituted for the specific example shown. This application is intended to cover adaptations or variations of the present subject matter. Therefore, it is intended that the invention be defined by the attached claims and their legal equivalents.

What is claimed:

1. A tea kettle, comprising:
   a kettle including a fill opening, the kettle including a thermometer having a temperature sensing element and a display;
   a lid adapted for removably mounting to the fill opening, the lid defining a timer housing having a mounting cavity, a heat shield and a housing floor, wherein an air gap is defined between the heat shield and the housing floor;
   an integrated timer mounted within the mounting cavity of the timer housing; and
   an infuser that is selectively couplable to the lid, the infuser including a mesh basket for retaining tea;
   wherein water contained within the kettle is heated to a steeping temperature corresponding to the type of tea to be steeped and whereupon reaching the steeping temperature, the infuser is attached to the lid and the lid is attached to the tea kettle such that the infuser is positioned within the water for a steep time, and wherein said integrated timer is insulated from direct exposure to the steeping temperature.

2. The tea kettle of claim 1, wherein the integrated timer includes a settable steep time selector.

3. The tea kettle of claim 2, wherein the settable steep time selector includes a digital input for adjustably selecting the steep time.

4. The tea kettle of claim 2, wherein the integrated timer includes a visual indicator display for visibly indicating when the steep time is concluded.

5. The tea kettle of claim 2, wherein the integrated timer includes an audio indicator for audibly indicating when the steep time is concluded.

6. The tea kettle of claim 1, wherein the infuser rotatably attached to a bottom surface of the lid.

7. The tea kettle of claim 1, wherein the kettle includes a heating element in proximity to a kettle floor.

8. A method for preparing hot tea, comprising:
   providing a tea kettle including a thermometer;
   fabricating a lid to include a timer housing, the time housing having a mounting cavity, a heat shield and a housing floor, wherein an air gap is defined between the heat shield and the housing floor;
   mounting an integrated timer within the mounting cavity of the timer housing;
   heating water within the tea kettle to a desired steep temperature as indicated on the thermometer;
   placing a selected tea in a mesh infuser basket;
   coupling the mesh infuser basket to a lid;
   attaching the lid to an opening on the tea kettle;
   steeping the tea in the heated water for a desired steep time; and
   monitoring the desired steep time with an integrated timer, wherein said integrated timer is insulated from the desired steep temperature.

9. The method of claim 8, further comprising:
   selecting the desired steep time with a digital input on the integrated timer.

10. The method of claim 9, wherein the step of selecting the desired steep time further comprises:
    selecting the desired steep time based upon the variety of tea placed in the mesh infuser basket.

11. The method of claim 8, wherein the step of coupling the mesh infuser basket to the lid comprises:
    rotatably coupling the mesh infuser basket to a bottom portion of the lid wherein the mesh infuser basket is lockably retained by the lid.

12. The method of claim 8, further comprising:
    monitoring a display element on the thermometer to verify when the desired steep temperature has been reached.

13. The method of claim 8, wherein the step of heating water in the kettle to a desired steep temperature comprises:
    providing a heating element in the kettle positioned in proximity to a kettle floor; and
    powering the heating element to provide heat to the water in the kettle.

14. The tea kettle of claim 1, wherein the timer housing is supported by a plurality of standoffs so as to define a circulation gap between the timer housing and the lid.

15. The method of claim 8, wherein mounting the integrated timer within the timer housing further comprises:
    supporting the timer housing with a plurality of standoffs so as to define a circulation gap between the timer housing and the lid.

* * * * *